April 17, 1934.  F. VON SCHÜTZ ET AL  1,955,696

GAS METER

Filed Jan. 26, 1931  2 Sheets-Sheet 2

Patented Apr. 17, 1934

1,955,696

UNITED STATES PATENT OFFICE 1,955,696

GAS METER

Friedrich von Schütz, Berlin, and Waldemar Holm, Furstenwalde, Germany

Application January 26, 1931, Serial No. 511,388
In Germany March 4, 1930

4 Claims. (Cl. 73—1)

This invention relates to gas meters, and more particularly to the counting mechanisms employed with the same.

Although various gas meter systems are in use, the majority of these are accompanied by the disadvantage that as the consumption increases the actual quantity indicated is too small.

In the case of gas meters furnished with reciprocatory measuring chamber walls this error is greatly dependent on the method of transmitting the motion of the diaphragm or bell to the counting mechanism. For the purpose of obtaining a more exact indication it has accordingly already been proposed, in lieu of counting the number of movements, to measure the actual distance traversed, since the volume per movement, due to the momentum of the reciprocating parts, and also for certain other reasons, increases with increased rate of passage of the gas, this leading to incorrect indication if merely the number of movements are counted in place of measurement of the distance traversed.

When measuring the way traversed by the diaphragm there is, at least when the meter is working at high speed, another error. If the diaphragm is moving quickly, it stretches and bulges out, so that the gas volume going through the meter at each stroke is no more proportional to the length of the stroke. It is the primary object of the present invention to overcome this inaccuracy in such cases in which a more exact measurement is desired, the invention enabling the error characteristic of the meter to be varied, and being capable of use in all cases in which, for indicating the volume, measurement is made of the distance traversed.

Other objects and advantages of the invention will become apparent as the description proceeds.

According to the invention, the fact that the extent of movement with increased passage of the gas is also increased to a slight degree is utilized to obtain with increased consumption what may be termed a plus indication, the extent of movement of the diaphragm or bell being transmitted to the counting mechanism to such a varying degree for each single movement that the variation in the extent of movement causes a more than proportional advance on the part of the mechanism.

Figure 1:
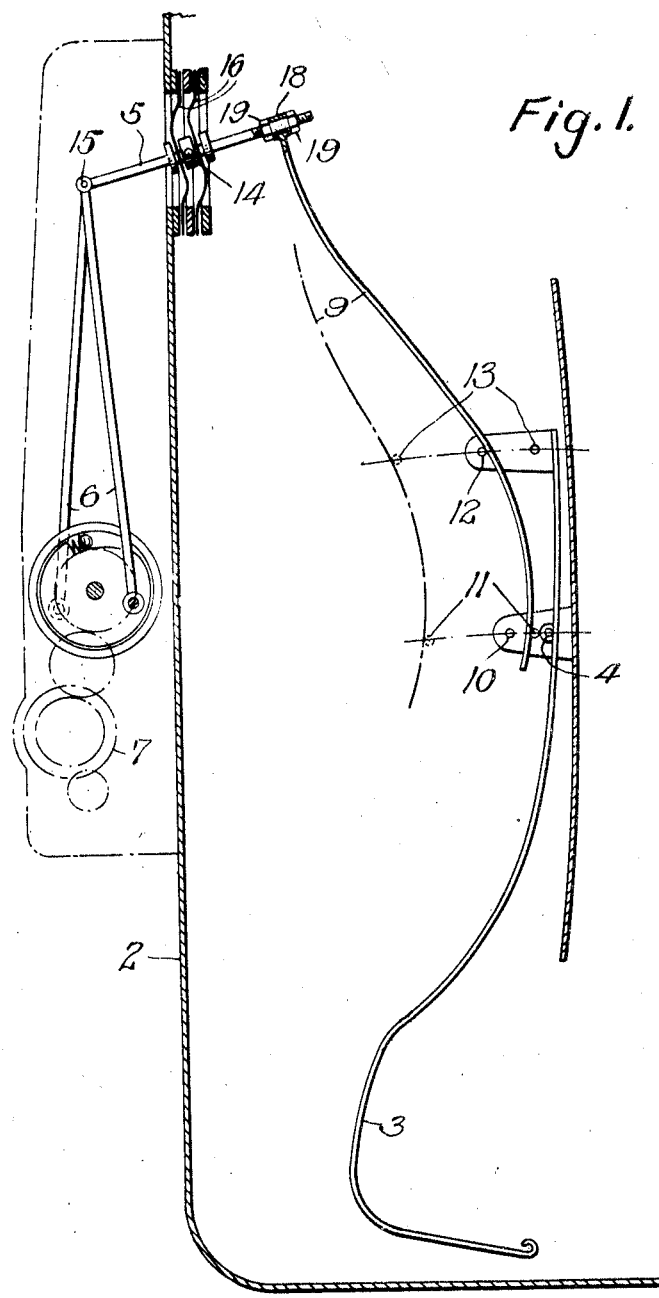

The invention will now be described more fully with reference to the accompanying drawings, Fig. 1 illustrating in diagrammatical form a possible method of transmission, Fig. 2 being a modification.

The plate of the diaphragm 1 is supported in the meter casing 2 by diaphragm guide lever 3 secured in pivotal fashion to the plate at 4. Through the casing wall 2 there is taken a lever 5 which is pivotally mounted by means of a pivot 14, arranged in front of a hole in the casing. Two ring shaped disks 16 of leather or other flexible material, fixed to lever 5 at their inner edges and to the wall 2 at their outer edges, prevent gas from entering the housing of the counting mechanism 7. The outer end 15 of lever 5 acts with the assistance of one or more rods 6 on a device measuring the extent of movement, which device, in the known manner, rectifies the movements of the lever 5, converting them into a progressive rotary motion, which is transmitted to the counting mechanism 7. The part of the lever 5 situated within the casing possesses an extension 9 taking over the movement of the diaphragm 1.

The operation of the arm 9 by means of the diaphragm occurs during the course of the movement through the medium of two stops 10 and 11, which preferably allow the lever a slight amount of play. Two additional stops 12 and 13 are mounted on an extension of the oscillating lever 3 so that they are nearer to the fulcrum point of lever 5 than the stops 10 and 11. Lever 9 is bent in such manner and the stops 12, 13 are so arranged that they strike the lever shortly before the movement is completed and cause the lever 9 to be lifted from the stops 10 and 11, which for this purpose are spaced at a sufficient distance apart.

In consequence, at the commencement and the end of each stroke the movement of the diaphragm will be transmitted to the lever 5 with a lever arm which is shorter than that which is effective during the intermediate part of the movement. Differences in the extent of movement will, therefore, be amplified in the movement of the lever 5. The counting mechanism 7 is upon increased movement of the diaphragm accordingly imparted a more greatly increased advance than would conform with the actual diaphragm increase, so that the gas meter, even in the case of a high consumption, will indicate the gas volume going through without error due to the bulging out of the diaphragm. The distance between the point at which the arm 9 is fixed to the lever 5 is preferably adjustable. For this purpose the end of the lever 5 is threaded, and the arm 9 ends in a bush 18 which is clamped by means of two nuts 19 threaded on lever 5.

Figure 2:
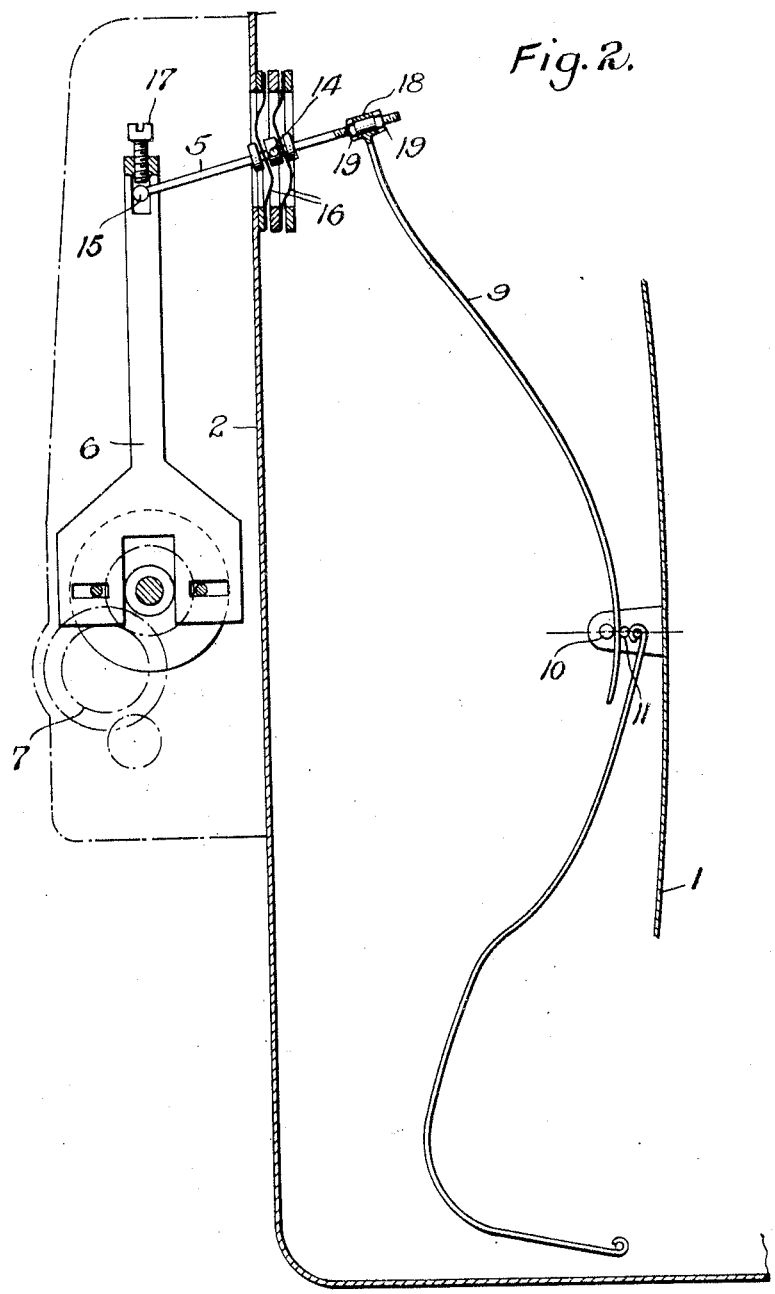

Fig. 2 illustrates a simplified form of construction. The transmission of the diaphragm movement to the lever 5 is performed by means of the arm 9 which engages with the stops 10, 11 mounted on an abutment of the diaphragm plate 1, and setting is performed in the manner described above by varying the distance between a fixed point of the lever 9 on lever 5 and the fulcrum point 14 of the lever 5. In this embodiment, however, provision is made for idle movement at a suitable point of the transmission lever syster. For example, the distance between the stops 10 and 11 might be correspondingly increased or, as illustrated in Fig. 2, the rod 6 is driven by means of a pin 15 at the end of lever 5 which moves in a slot of the rod 6. Other expediences are naturally also possible pursuing the same object. As compared with a gas meter adjusted without idle movement of this kind, the length of the lever 5 must be made longer between its axis 14 and the point of suspension of the rod 15, in order to obtain the proper advance on the part of the counting mechanism. The idle motion in the transmitting mechanism between diaphragm and counting device results in that the part of the stroke of the diaphragm that is always the same, no matter whether the meter is going at low or high speed, is transmitted only partly to the counting mechanism; in consequence, the variations of the other part of the stroke act to an increased extent on the mechanism as compared with their proportion to the length of the stroke. Differences in the extent of movement of the meter will accordingly in this case also be made to act to an increased extent on the mechanism as compared with its proportion to the actual amount of transmission.

This will be more readily apparent with the assistance of an example. It is assumed that in the normal arrangement the extent of movement of the point 15 amounts to 10 mm. on the normal stroke, and to 11 mm. when a large amount of gas is passing through, this representing an increased advance of the mechanism amounting to 10% conforming with similar increase in the movement of the meter. At the point 15 there is provided an idle motion amounting to 5 mm. In order to again arrive at the same advance the distance between the fulcrum point 14 of the lever 5 and the fixed point of the lever 9 is increased by approximately the half, so that the point 15 on the normal stroke will move 15 mm. and upon increased passage of the gas 15×1.1=16.5 mm. The rods 6 follow this distance less the extent of idle movement amounting to 5 mm., and accordingly described a movement amounting to 10 mm. for the normal stroke and 11.5 mm. with increased gas. In this case the counting mechanism is accordingly advanced .5 mm. in excess when the quantity of gas is high, thus compensating the error due to the bulging out of the diaphragm.

A particular advantage of this apparatus consists in the fact that as regards transmission lever mechanisms of the kind described no difficulty is encountered, but to the contrary a facilitation obtained, if provision is purposely made for idle movement at certain points.

By making the stops 12 and 13 according to Fig. 1, or the idle movement according to Fig. 2, the latter by means of the screw 17, adjustable, it is possible to subsequently vary the characteristic of the meter.

What we claim as new and desire to secure by Letters Patent is:

1. In a gas meter, a casing having a hole in its wall, a diaphragm in the casing, a pair of stops supported by said diaphragm, a diaphragm guide lever, a pair of stops on said lever, a pivot arranged in front of the hole, an oscillating lever pivotally supported by the pivot, an extension on said oscillating lever adapted to engage with the stops of the diaphragm guide lever at the commencement and at the end of each stroke of the diaphragm and adapted to engage with the stops of the diaphragm during the intermediate part of the stroke of the diaphragm, the stops of the diaphragm guide lever and diaphragm being so arranged that the distance between the pivot supporting the oscillating lever and the stops of the diaphragm guide lever is shorter than the distance between this pivot and the stops of the diaphragm, a counting mechanism, and means including a clutch connected by a rod with the oscillating lever for actuating the counting mechanism upon oscillation of the said lever.

2. In a gas meter, a casing having a hole in its wall, a diaphragm in the casing, a pair of stops supported on said diaphragm, a pivot arranged in front of said hole, an oscillating lever pivotally supported by the pivot, an extension on said oscillating lever adapted to engage with said stops, a counting mechanism, means including a clutch connected by a rod with the oscillating lever for actuating the counting mechanism upon oscillation of the said rod by the lever, a slot in said rod, and a pin on the end of the lever adapted to engage the slot in the rod.

3. In a gas meter, a casing having a hole in its wall, a diaphragm in the casing, a pair of stops supported on the diaphragm, a pivot arranged in front of said hole, an oscillating lever pivotally supported by the pivot, an extension on said lever adapted to engage with said stops, a counting mechanism, a clutch operatively connected with the counting mechanism, a rod connecting the oscillating lever with the clutch for actuating the counting mechanism upon oscillation of the said rod by the lever, a slot in said rod, a screw adapted to vary the effective length of the slot, and a pin at the end of the lever, adapted to engage in the slot.

4. In a gas meter, a casing having an opening in its wall, a diaphragm in said casing, a lug on said diaphragm and having spaced pins, a lever pivoted to said casing adjacent said opening and extending through said opening on each side thereof, an extension positioned in said casing and having a portion loosely extending between said pins, means mounting said extension on the end of said lever in the casing, a rod pivoted to the end of said lever outside of said casing, a clutch operated by said rod, and a counting mechanism operated by said clutch.

FRIEDRICH von SCHÜTZ.
WALDEMAR HOLM.